3,497,783
BRUSHLESS DIRECT CURRENT MOTOR
J. Roger Toth, Macedonia, and Michael L. Gilliland, Kent, Ohio, assignors to Ametek, Inc., a corporation of Delaware
Filed May 22, 1967, Ser. No. 640,105
Int. Cl. H02k 29/02
U.S. Cl. 318—138                    8 Claims

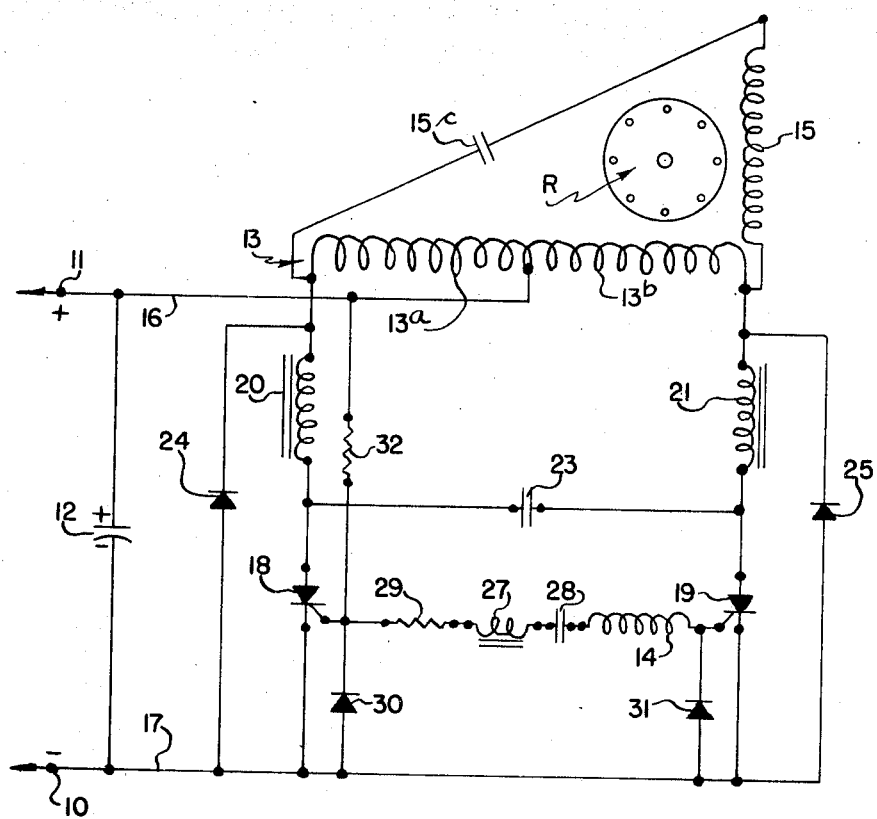

ABSTRACT OF THE DISCLOSURE

A brushless direct current energized motor having a main field winding, a feedback winding associated in the field structure, a pair of silicon controlled rectifier devices alternately gated, by a firing circuit including the feedback winding, for controlling current flow in opposite directions in the field winding to produce an alternating field, and a commutating capacitor connected across the SCR anodes in a parallel capacitor type configuration; resonant inductors in series between respective SCR's and ends of the main winding; for each SCR a diode with anode and cathode respectively connected to the cathode of the SCR and the corresponding end of the field winding, direct current supply leads respectively to the center of the main winding and SCR cathodes, a capacitor energy sink across the leads; the particularly disclosed motor having a starting field winding and phase shifting capacitor in series across the ends of the main winding; the motor winding, resonant inductors and commutating capacitor constituting an at least semi-tuned circuit, and the diodes feeding reactive power back to the energy sink.

---

The present invention relates to so-called brushless direct current motors wherein the usual field winding constitutes part of an oscillator-type inverter, the electronic switching devices of which are controlled by a timing pulse circuit establishing the operation frequency and thereby motor speed.

The general object of the present invention is to provide improved circuitry in a motor of the type described. Another object is to provide increased circuit efficiency in such a motor, whereby heavier loads may be handled than usual with prior similar motors for a given input. Another object is to provide means in the circuit for feeding reactive power of the circuit back to the supply without requiring motor windings having taps for this particular purpose. Another object is to provide cooler operation of the motor by reducing the effective current in the motor windings for given loading conditions. Another object is to provide circuitry in which the size of the commutator capacitor may be reduced in comparison with prior motor circuitry. A still further object is to improve the turn-off time for silicon controlled rectifiers used in the inverter circuitry of the motor.

Other objects and advantages will appear from the drawing and the following description thereof.

The drawing represents schematically the present invention as applied to a motor energized by direct current from a supply such as a battery, generator or rectifier, applied at negative and positive input terminals 10, 11 having thereacross an electrolytic type supply capacitor 12. The motor includes a rotor R, e.g., an induction motor type rotor, a stator provided with a main winding 13, feedback winding 14, and a starting winding 15 with effective axis physically displaced in angular sense from the main winding, as usual in a capacitor start single phase induction motor; the starting winding 15 in series with starting capacitor 15c. The two halves 13a, 13b of the main winding may actually be wound bifilar on the stator structure, and so connected that as they are alternately energized by direct current, fed by the lead 16 from terminal 11 to the main winding center tap, alternating magnetization of the stator occurs and the rotor is driven as in a single phase induction motor.

As switching devices for alternating field energization, silicon controlled rectifiers, the SCR's 18, 19, are connected with cathodes to the negative or ground lead 17 from terminal 10, anodes through inductors 20, 21 to the outer ends respectively of the winding halves 13a, 13b, and gates to the firing or gating circuit to be described; a commutating capacitor 23 being provided between the SCR anodes.

Reactive energy feedback diodes 24, 25 are connected with anodes to the negative lead 17 and cathodes to the respective ends of winding 13.

To fire the SCR's at appropriate times a suitable gating circuit is provided, as suggested by the feedback winding 14 connected between the gate electrodes in a series resonant network including inductor 27 and capacitor 28 with a further impedance adjusting component such as resistor 29 with the diodes 30, 31 between the ground lead 17 and the respective gates, the diodes in effect as switches connecting a respective one end of the feedback winding to ground to complete a branch including the gate and cathode of the SCR at the other end. A network of known type may be included to insure firing of only one or the other of the SCR's upon initial application of voltage to the terminals 10, 11 (e.g., comprising resistor 32 from positive lead 16 to the gate of SCR 18 utilizing a direct current supply switching transient as a gating pulse). Other gating circuits may be used, including, for example, that of pending application Ser. No. 559,646.

In operation, the general action of the motor circuitry is similar to that of a parallel capacitor type inverter, the rotor in effect the load and secondary relative to the main winding as a transformer primary; the gating pulses being derived from the coupling of the feedback winding with the main winding, and the commutating capacitor serving to apply a reverse bias to turn off one conducting SCR when the other is gated on.

Where the supply is seen at the input as sufficiently capacitive to serve as an "energy sink," the feedback diodes 24, 25, each connected in sense opposite to the respective SCR to pass current in the reverse direction to the latter between lead 17 and the winding, advantageously enable return of reactive energy to the supply from the inductive elements of the circuit, particularly the main winding, during the switching interval and also other times; and accordingly capacitor 12 is provided across the input leads representing such or serving as an energy sink.

The main winding, resonant inductors and commutating capacitor have values selected to provide at least a semi-tuned condition thereby shaping the voltages effective on the divided main winding for improved circuit efficiency, which is also furthered by the use of the capacitive energy sink 12 in conjunction with the feedback diodes 24, 25, especially with the location shown; and, as tuning is simply achieved by adjusting the relative inductive and capacitive values, especially of inductors 20, 21 and capacitor 23, by careful tuning, it is possible readily to obtain considerable increases in efficiency in comparison with similar motor circuitry lacking these expedients.

It has been further found, in comparison with analogous circuitry, that by the described circuitry the effective current returned to capacitor 12 is reduced, thereby minimizing the requirements for the latter; that the effective current to the winding 13 is reduced for a given loading with consequent lower motor temperature; and that the turn-off time for the SCRs is reduced.

Though the invention has been described as embodied in a motor wound and operable as a single phase type, and with SCRs as switching devices, it is to be understood that it is applicable in similar inverter circuitry using other switching devices and in similar motors of polyphase types.

We claim:

1. In a brushless direct current motor including a rotor, a stator having a divided main winding, electronic switching devices connected between one direct current input lead and respective ends of the main winding, a second direct current input lead to the center of the main winding, a control network whereby said devices are alternatively switched to opposite off-on conditions for alternately energizing the respective halves of the main winding and producing an alternating stator magnetic field by inverter action thereby to drive the rotor, the improvement comprising:

respective inductors, distinct from said stator, connecting said switching devices to the main winding ends and a commutating capacitor between the sides of the switching devices connected to the respective inductors; the said commutating capacitor, inductors and main winding comprising an at least semi-resonant circuit.

2. The improvement in a brushless direct current motor as described in claim 1, having diodes connected between the said one lead and the respective ends of the main winding for conduction of current in sense opposite the conduction of said devices, and a reactive power accepting capacitor across said leads.

3. The improvement in a brushless direct current motor as described in claim 2, wherein:

said switching devices are silicon controlled rectifiers connected with cathodes to ground an anodes respectively through said inductors to the main winding ends, and are gated by said control network.

4. The improvement in a brushless direct current motor as described in claim 1 wherein:

said switching devices are silicon controlled rectifiers connected with cathodes to ground and anodes respectively through said inductors to the main winding ends, and are gated by said control network.

5. In a parallel capacitor type inverter including a transformer having a divided primary main winding and a loaded secondary winding, electronic switching devices connected between one direct current input lead and respective ends of the main winding, a second direct current input lead to the center of the main winding, a control network whereby said devices are alternatively switched to opposite off-on conditions for alternately energizing the respective halves of the main winding and producing an alternating current in the loaded secondary winding by inverter action, the improvement comprising:

respective inductors distinct from said transformer, connecting said switching devices to the main winding ends and a commutating capacitor between the sides of the switching devices connected to the respective inductors; the said commutating capacitor, inductors and main winding comprising an at least semi-resonant circuit.

6. The improvement as described in claim 5, having diodes connected between the said one lead and the respective ends of the main winding for conduction of current in sense opposite the conduction of said devices, and a reactive power accepting capacitor across said leads.

7. The improvement as described in claim 6, wherein: said switching devices are silicon controlled rectifiers connected with cathodes to ground and anodes respectively through said inductors to the main winding ends, and are gated by said control network.

8. The improvement as described in claim 5, wherein: said switching devices are silicon controlled rectifiers connected with cathodes to ground and anodes respectively through said inductors to the main winding ends, and are gated by said control network.

References Cited

UNITED STATES PATENTS

| | | | |
|---|---|---|---|
| 3,083,326 | 3/1963 | Deming et al. | 331—113.1 |
| 3,328,598 | 6/1967 | Katz | 318—138 XR |
| 3,364,408 | 1/1968 | Katz et al. | 318—138 |
| 3,365,636 | 1/1968 | Baker | 318—138 |
| 3,378,752 | 4/1968 | Naylor | 331—113.15 |
| 3,416,055 | 12/1968 | Toth | 318—138 |

G. R. SIMMONS, Primary Examiner

U.S. Cl. X.R.

318—227, 231; 331—113